US010369735B2

United States Patent
Speith et al.

(10) Patent No.: US 10,369,735 B2
(45) Date of Patent: Aug. 6, 2019

(54) MARKING STRIP

(71) Applicant: Weidmüller Interface GmbH & Co. KG, Detmold (DE)

(72) Inventors: Markus Speith, Paderborn (DE); Andreas Wieneke, Lemgo (DE); Ditmar Schreiber, Bad Lippsringe (DE); Thorsten Rieke, Detmold (DE); Thorsten Bett, Hövelhof (DE); Maximillian Schneider, Nieheim (DE); Maximilian Rosin, Detmold (DE); René Hülsmann, Bad Salzuflen (DE)

(73) Assignee: Weidmüller Interface GmbH & Co. KG (DE)

( * ) Notice: Subject to any disclaimer, the term of this patent is extended or adjusted under 35 U.S.C. 154(b) by 0 days.

(21) Appl. No.: 15/510,102

(22) PCT Filed: Aug. 31, 2015

(86) PCT No.: PCT/EP2015/069813
§ 371 (c)(1),
(2) Date: Mar. 9, 2017

(87) PCT Pub. No.: WO2016/037874
PCT Pub. Date: Mar. 17, 2016

(65) Prior Publication Data
US 2017/0282431 A1    Oct. 5, 2017

(30) Foreign Application Priority Data

Sep. 14, 2014   (DE) .................. 10 2014 113 075
Jun. 8, 2015    (DE) .................. 10 2015 109 020

(51) Int. Cl.
*G09F 3/00*      (2006.01)
*B29C 48/00*     (2019.01)
(Continued)

(52) U.S. Cl.
CPC .......... *B29C 48/0022* (2019.02); *B29C 48/12* (2019.02); *B29C 48/154* (2019.02);
(Continued)

(58) Field of Classification Search
CPC ........ H01B 37/361; H01B 7/365; H01B 7/36; H01B 13/341; H01B 7/366; H01B 7/368;
(Continued)

(56) References Cited

U.S. PATENT DOCUMENTS

| 4,268,986 A | * | 5/1981 | Piana ...................... G09F 3/205 |
| | | | 40/316 |
| 4,889,474 A | * | 12/1989 | Nakajima ............ B60H 1/3223 |
| | | | 417/295 |

(Continued)

FOREIGN PATENT DOCUMENTS

| DE | 6927061 U | 11/1969 |
| DE | 202004009980 U1 | 12/2005 |

(Continued)

*Primary Examiner* — Cassandra Davis
(74) *Attorney, Agent, or Firm* — Laubscher & Laubscher, P.C.

(57) ABSTRACT

A marking strip has a plurality of marking elements which are connected to each other by a connecting region. The marking strip having the marking elements is designed to mark electrical devices, in particular electrical devices that can be arranged next to each other such as terminal blocks. Each of the marking elements has a marking plate including at least one writing field which can be provided with information. On the side facing away from the writing field, each of the marking elements has a locking contour which is integrally connected with the marking plate. The marking strip is formed of at least two different plastic materials of different hardness. The locking contour of each marking element is formed of a harder plastic material, and the marking plate is formed of a softer plastic material at least (Continued)

in the region of the writing field. The connecting region between the marking elements is formed of the softer plastic material.

24 Claims, 10 Drawing Sheets

(51) Int. Cl.
| | |
|---|---|
| B29C 48/12 | (2019.01) |
| B29C 48/18 | (2019.01) |
| G09F 3/06 | (2006.01) |
| G09F 3/16 | (2006.01) |
| G09F 3/20 | (2006.01) |
| G09F 7/06 | (2006.01) |
| H01R 9/26 | (2006.01) |
| H01R 13/46 | (2006.01) |
| G09F 3/02 | (2006.01) |
| B29C 48/154 | (2019.01) |
| B29C 48/16 | (2019.01) |
| B29K 55/02 | (2006.01) |
| B29K 69/00 | (2006.01) |
| B29K 75/00 | (2006.01) |
| B29K 77/00 | (2006.01) |
| B29K 101/12 | (2006.01) |
| B29L 9/00 | (2006.01) |
| B29L 31/00 | (2006.01) |

(52) U.S. Cl.
CPC .............. *B29C 48/16* (2019.02); *B29C 48/18* (2019.02); *G09F 3/02* (2013.01); *G09F 3/0295* (2013.01); *G09F 3/06* (2013.01); *G09F 3/16* (2013.01); *G09F 3/205* (2013.01); *G09F 7/06* (2013.01); *H01R 9/2683* (2013.01); *H01R 13/465* (2013.01); *B29K 2055/02* (2013.01); *B29K 2069/00* (2013.01); *B29K 2075/00* (2013.01); *B29K 2077/00* (2013.01); *B29K 2101/12* (2013.01); *B29K 2995/007* (2013.01); *B29L 2009/00* (2013.01); *B29L 2031/7232* (2013.01); *G09F 2003/0201* (2013.01); *G09F 2003/0202* (2013.01); *G09F 2003/0222* (2013.01); *G09F 2003/0263* (2013.01)

(58) Field of Classification Search
CPC . G09F 3/205; G09F 3/202; G09F 3/00; G09F 3/06
See application file for complete search history.

(56) References Cited

U.S. PATENT DOCUMENTS

| | | | |
|---|---|---|---|
| 7,194,829 B2* | 3/2007 | Boire | G09F 3/00 |
| | | | 40/316 |
| 8,863,415 B2* | 10/2014 | Muraco | A61B 7/02 |
| | | | 24/115 R |
| 2017/0148362 A1* | 5/2017 | Pizzi | G09F 3/205 |

FOREIGN PATENT DOCUMENTS

| | | | |
|---|---|---|---|
| DE | 202007012606 U1 | | 2/2009 |
| DE | 102009006793 A1 | | 8/2010 |
| DE | 202009003250 U1 | * | 8/2010 |
| DE | 102009014694 A1 | | 10/2010 |
| WO | 2010108673 A1 | | 9/2010 |

* cited by examiner

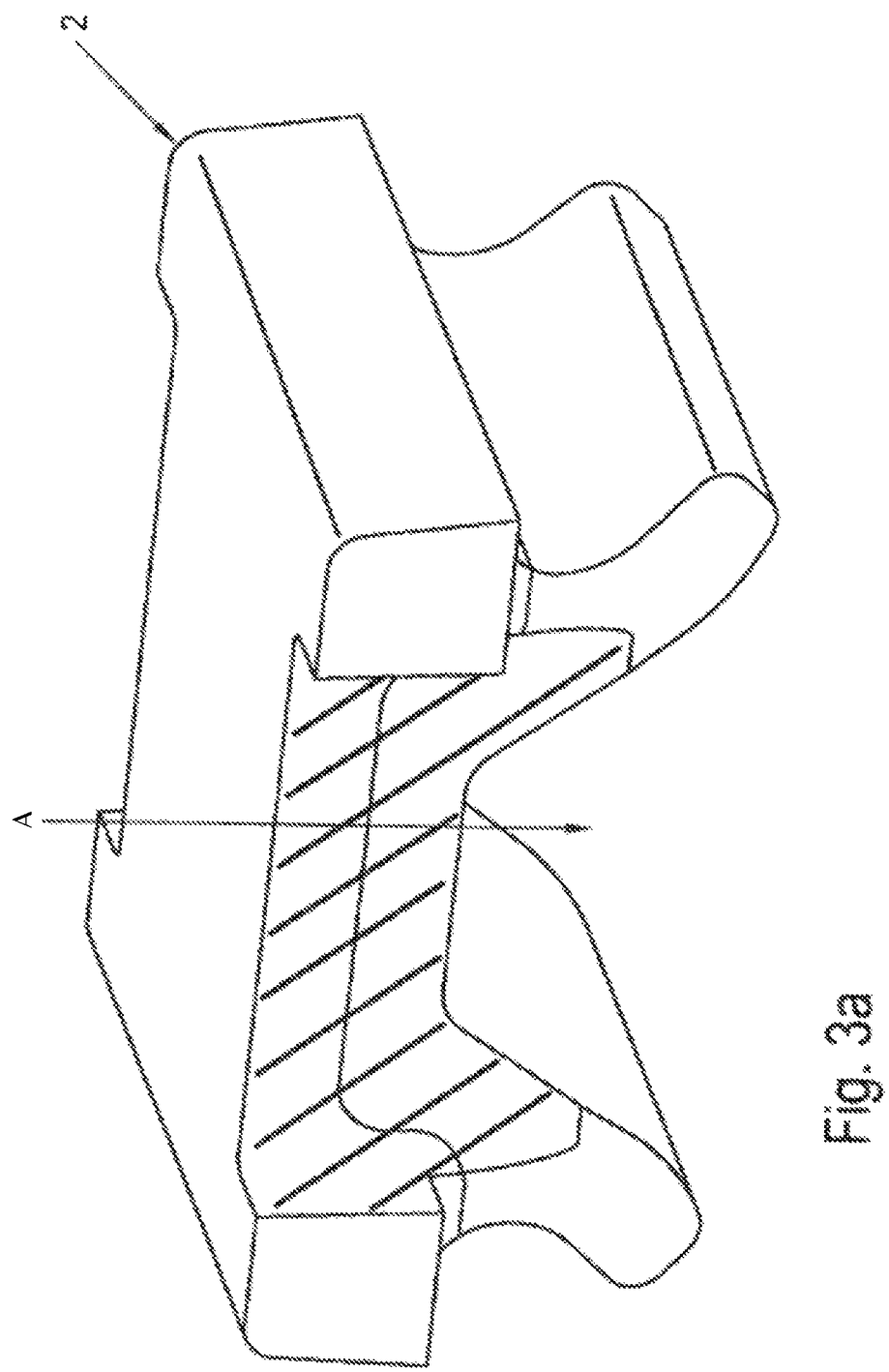

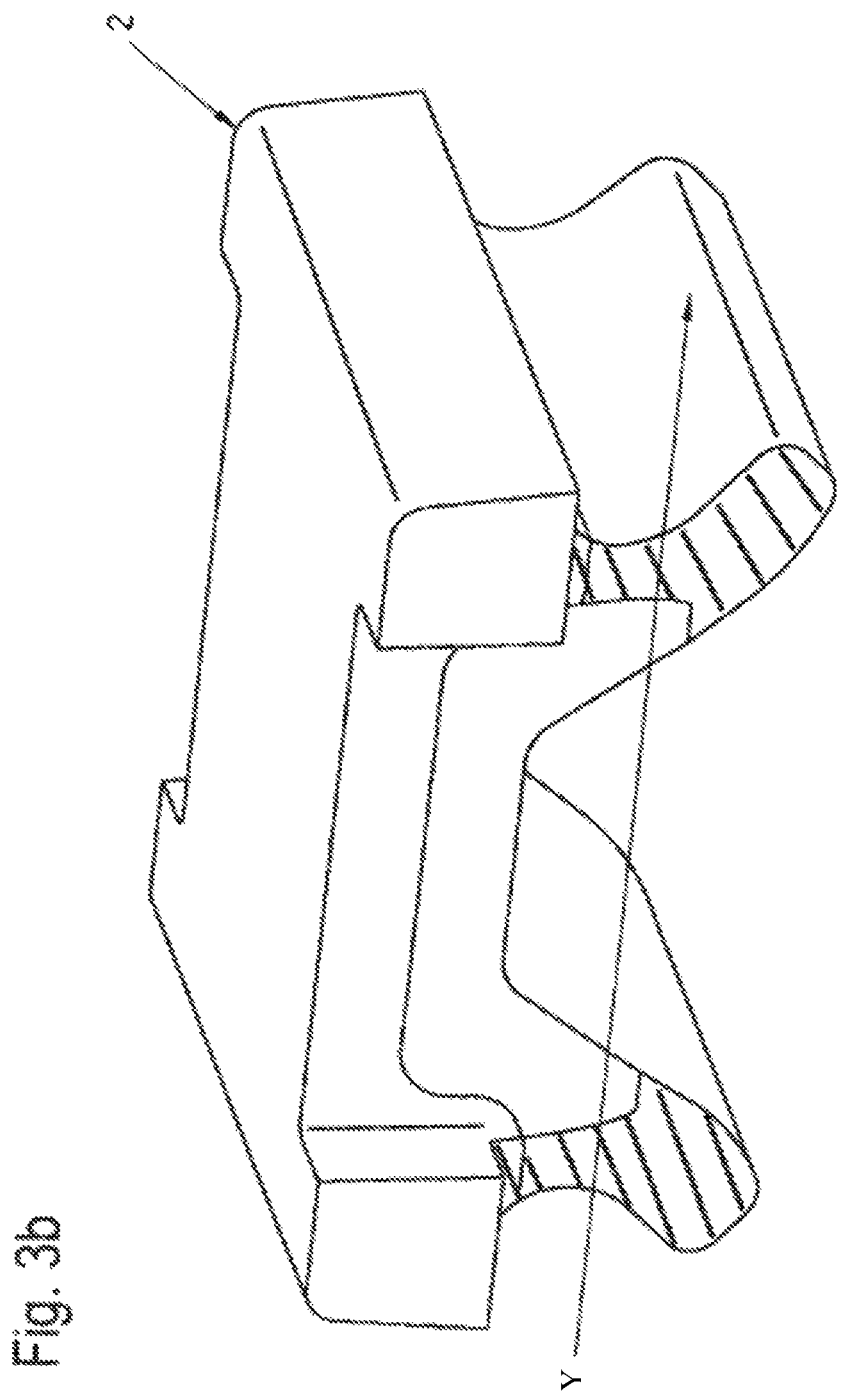

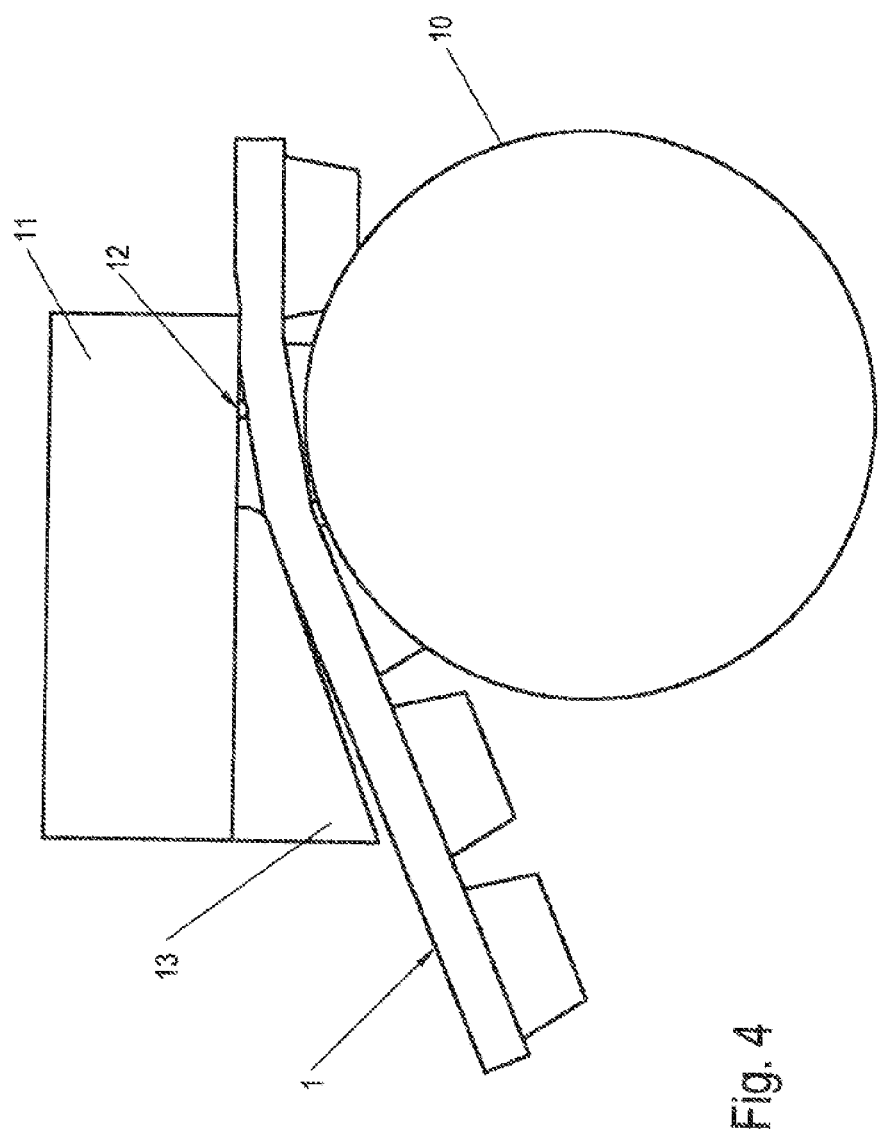

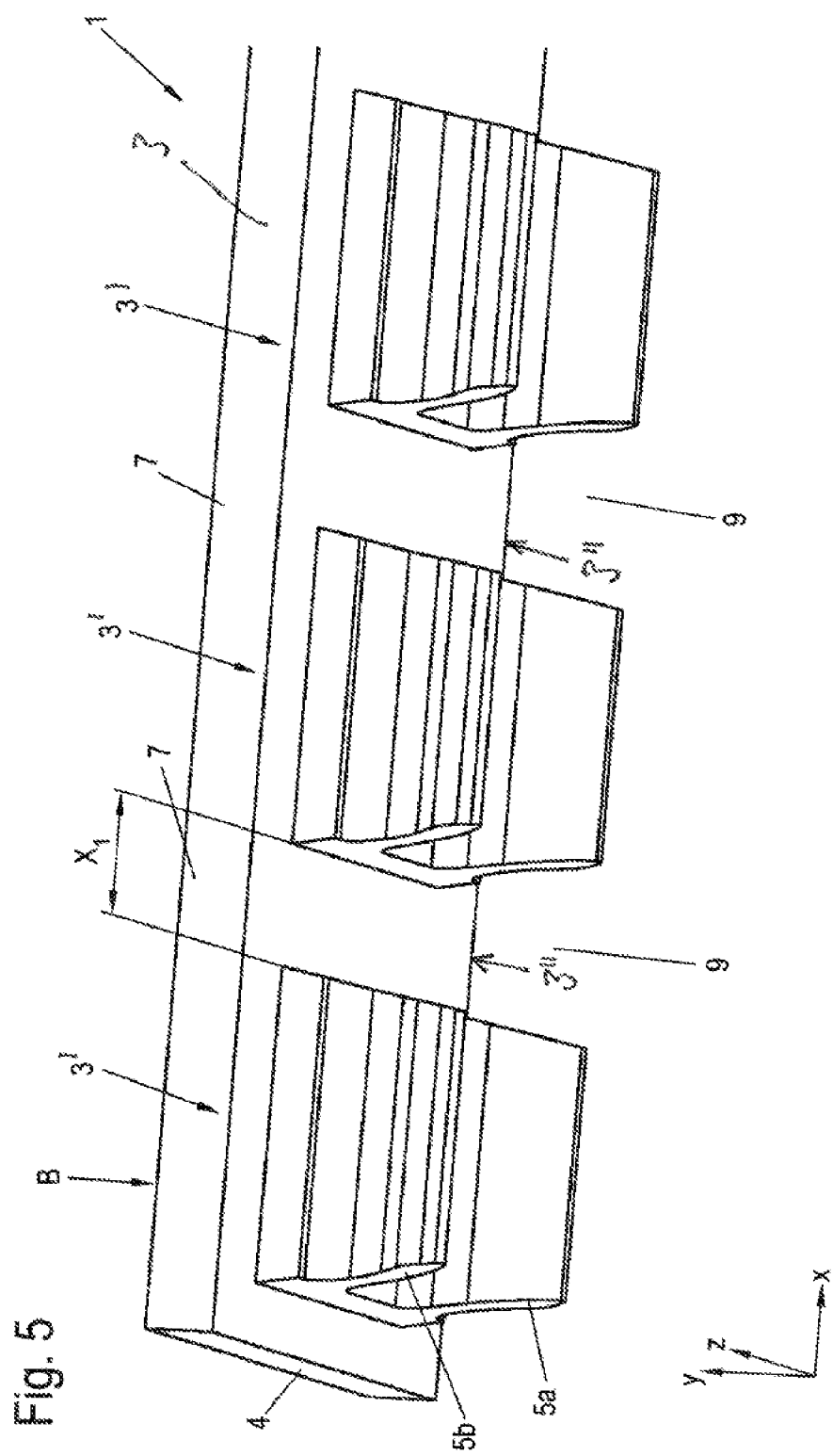

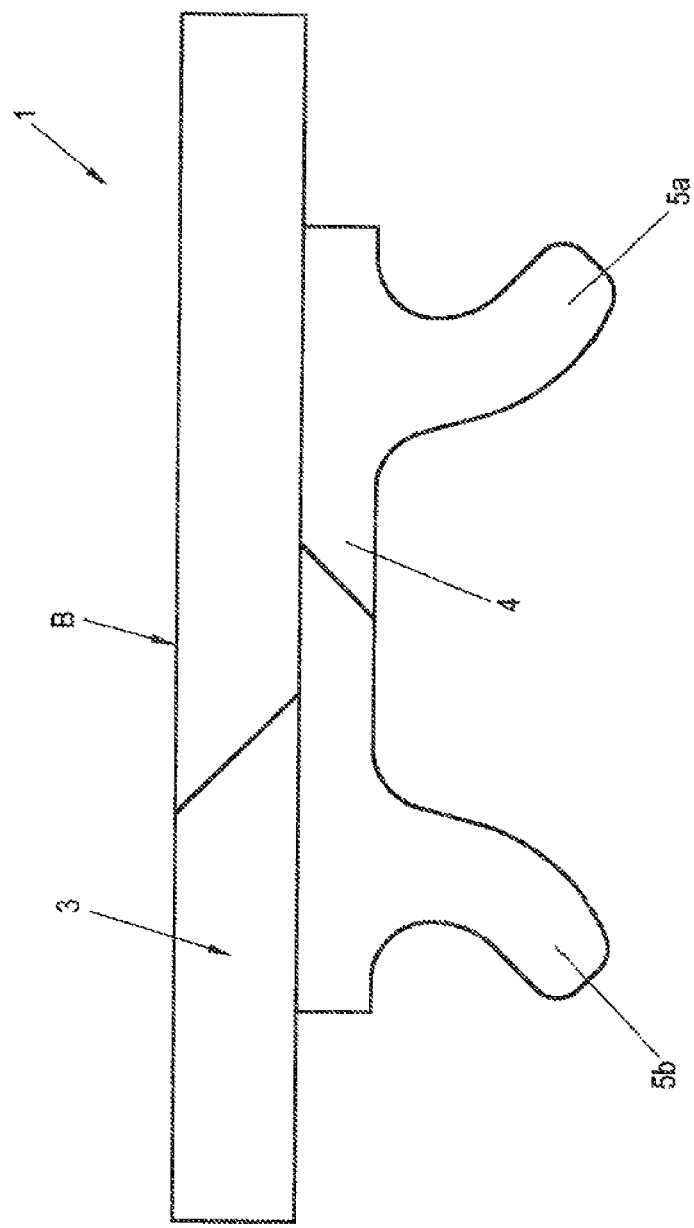

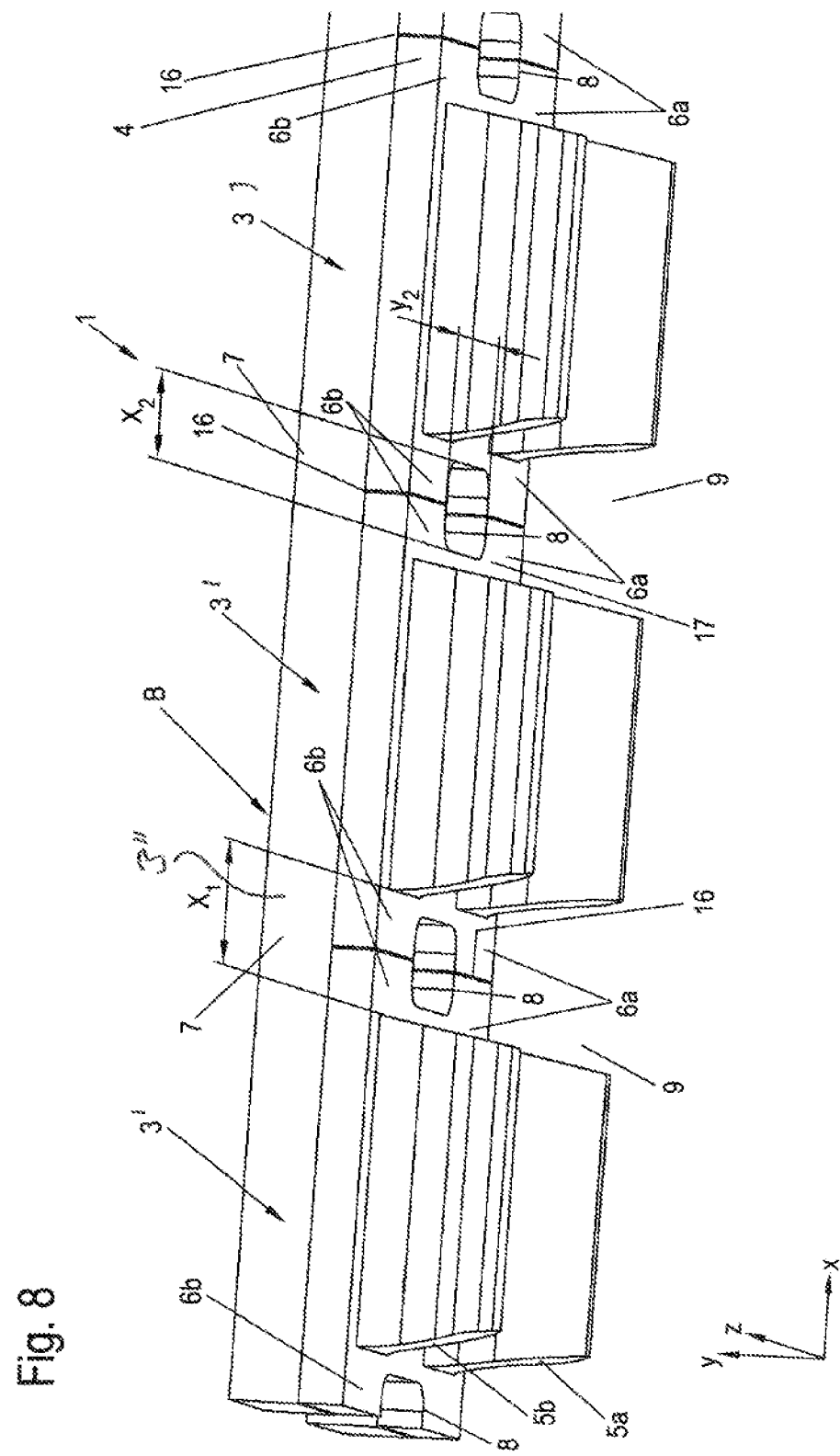

MARKING STRIP

This application is a § 371 National Stage Entry of PCT International Application No., PCT/EP2015/069813 filed on Aug. 31, 2015. PCT/EP2015/069813 claims priority of DE 102014113075.8 filed Sep. 10, 2014 and DE 102015109020 filed Jun. 8, 2015. The entire contents of these applications are incorporated herein by reference.

BACKGROUND OF THE INVENTION

The invention relates to a marking strip.

From DE 20 2007 012 606 U1, it is known to produce markers for electrical lines, cables and wires by a two-component injection molding process, in which a marking plate is formed of a harder plastic than spring elements arranged on the marking plate for fastening the marker to the cable.

If a plurality or a variety of electrical devices such as terminal blocks are arranged next to each other on an assembly base, each device having a locking contour such as a locking recess, the marking process is simplified if, instead of a plurality of completely separated marking elements such as shown in FIG. 2, marking elements are used that are connected to one another in the form of strips. For example, for marking a terminal block assembly on a supporting rail, it is then only necessary to lay the marking strips within the region of the locking contours, which are arranged next to each other, of the terminal blocks, and then to press on the individual marking elements from above, in such a manner that secure locking of the marking elements on the devices, in particular on the terminal blocks, occurs. In particular, the marking strip or the marking elements thereof are suitable for printing using a thermal transfer technology and the constraints thereof.

For producing such marking strips, injection molding processes are used. Strips having a defined length of approximately eight marking elements are produced and then joined together in order to provide a spool with a long marking strip from which marking strips having a desired number of marking elements can be cut to length. In this process, it is particularly difficult to reliably produce an endless strip for rolling onto a spool from the individual injection molded strips without misalignment.

SUMMARY OF THE INVENTION

The marking strip is formed of at least two different plastic materials of different hardness, the locking contour of each marking element being formed of the harder plastic material, and at least in the region of the writing field, the marking plate is formed of the softer plastic material. The connecting region between the marking elements in each case is formed at least partially of the softer plastic material.

Preferably, the marking strip is first produced by an extrusion process and then processed further.

According to a preferred embodiment of the invention, the marking strip is formed of at least two plastic materials and, preferably of two plastic materials of different hardness. Preferably, it is fabricated by a multi-component, in particular a two-component, co-extrusion process.

In this way, it is possible to use plastics of different hardness for the regions of the marking plate with the writing field, and for the locking contour, respectively. The two-component co-extrusion process is a reliable and cost effective process, in particular in comparison to injection molding. With the extrusion process, an endless strip can easily be produced for rolling on a spool. Due to extrusion, in particular co-extrusion, the marking strips or the marking elements thereof can be used for printing using thermal transfer technology.

According to preferred embodiment, it is advantageous if the locking contour of each marking element is formed of the harder plastic material, in order to be able to snap it securely on the respective electrical device. In addition, it is advantageous if the marking plate is formed of the softer plastic material at least in the region of the writing field so that it can be printed on more precisely. The softer material facilitates the automatic adaptation to the printing head and it is also gentler on the printing head than a harder material. In addition, sink marks are prevented, and it is possible to design longer printable regions since they tilt less easily in the region of the printing head and/or do not lift off the heating bar. Furthermore, it is possible to select an easily printable material without having to ensure that the material is sufficiently hard for the locking function performed by the locking bars or locking feet.

It is also advantageous if the connecting region between the marking elements in each case includes a softer plastic region. This makes it possible, by pulling or compressing this region at the assembly site to compensate for smaller tolerances resulting from stacking the electrical devices. In addition, rolling the elements on the spool is facilitated.

Furthermore, it is advantageous if the connecting region between the marking elements includes at least one connecting bar. The connecting region between adjacent marking elements contains at least one hole, in particular an elongate hole which passes through the marking element in a snap-on direction perpendicular to the stacking direction thereof. Owing to the hole, the resilience of the connecting region can be increased or set in a targeted manner. In addition, the hole can be used as a sensing device for a sensor of a printer for triggering or for stopping printing.

The hole is preferably formed between two connecting bars. In this manner, particularly good sensing is possible.

The region under the connecting bars, in each case between two adjacent marking elements, contains which separates the locking bars of adjacent devices from one another. The connecting regions connect the marking plates to one another above this slot.

In a preferred embodiment, the marking plate of the marking strip has no holes and/or marginal recesses. As a result, writings that span over devices can easily be implemented.

In another embodiment, the marking plate of the marking strip is produced from a lighter colored plastic material than the locking contour of the marking strip. As a result, sensing for a printer sensor can occur for triggering or stopping printing—that is for sensing a device-specific grid dimension—without indexing perforation. This is possible particularly if the marking plate is produced from a white plastic material, and the locking contour is produced from a black plastic material.

In another embodiment, the marking plate of the marking strip is produced from a translucent plastic material. As a result, sensing for a printer sensor can occur for triggering or stopping printing—that is to say for sensing a device-specific grid dimension—without an indexing perforation. This is particularly possible if the marking plate is produced from a transparent plastic material.

According to a method for producing a marking strip a strip is extruded using a two-component, co-extrusion process from two plastic materials of different hardness so that a locking contour of each marking element is formed of the harder plastic material and the marking plate, at least in the region of the writing field, is formed of the softer plastic material. The connecting region between the marking elements is at least partially formed within the softer plastic region. The locking bars of adjacent marking elements of the marking strip are then separated from one another.

The production is particularly simple if the region that includes the first material is U-shaped in cross section, and the region that includes the second harder material is generally V-shaped.

BRIEF DESCRIPTION OF THE FIGURES

Other objects and advantages of the invention will become apparent from a study of the following specification when viewed in the light of the accompanying drawing, in which:

FIG. 1b is a cross-sectional view of the marking strip of FIG. 1a;

FIGS. 3a and 3b are perspective views of an individual marking element of a marking strip with shadings and arrows which illustrate punching processes during the production of the marking strip;

FIG. 4 is a diagrammatic representation of a marking strip located in the region of a printing head of a printer;

FIG. 5 is a perspective view of an alternate embodiment of a marking strip;

FIG. 6 is a cross-sectional view of the marking strip of FIG. 5;

FIG. 8 is a perspective view of an additional embodiment of a marking strip according to the invention.

DETAILED DESCRIPTION

Figure 1A:
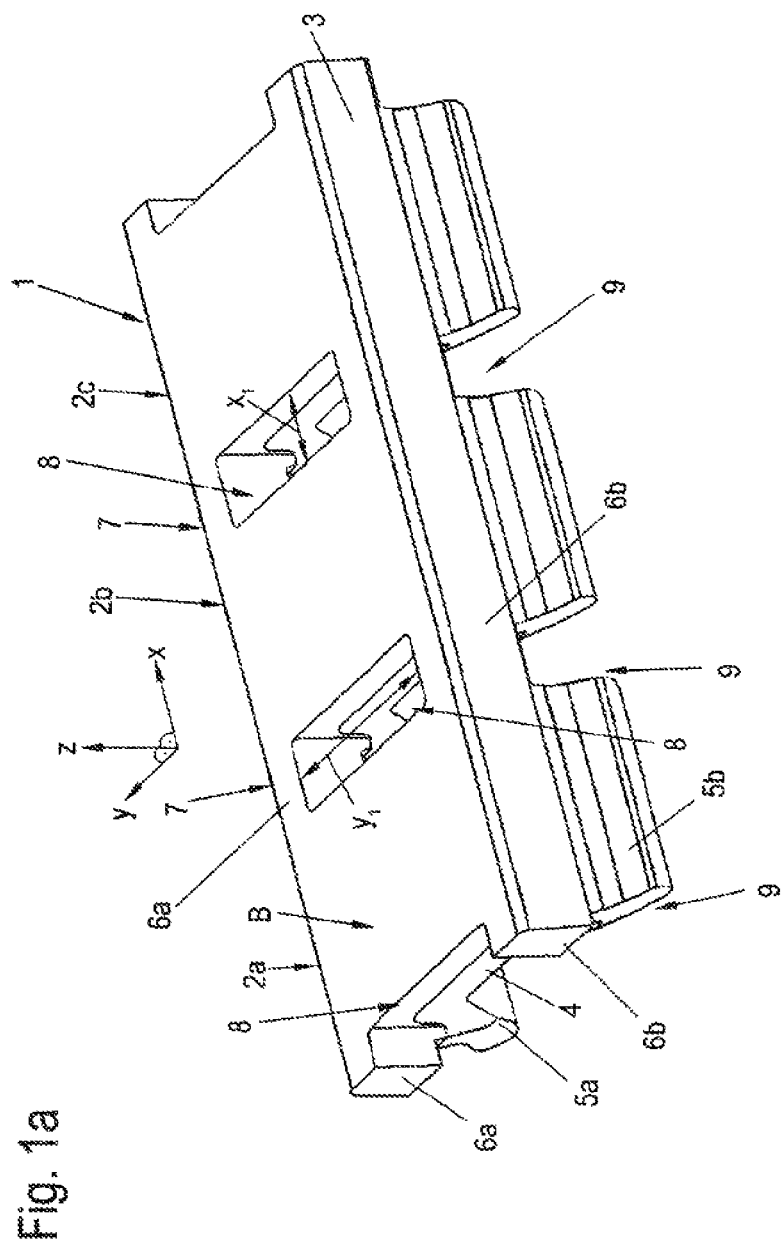
FIG. 1a is a perspective view of a marking strip.
Figure 1B:
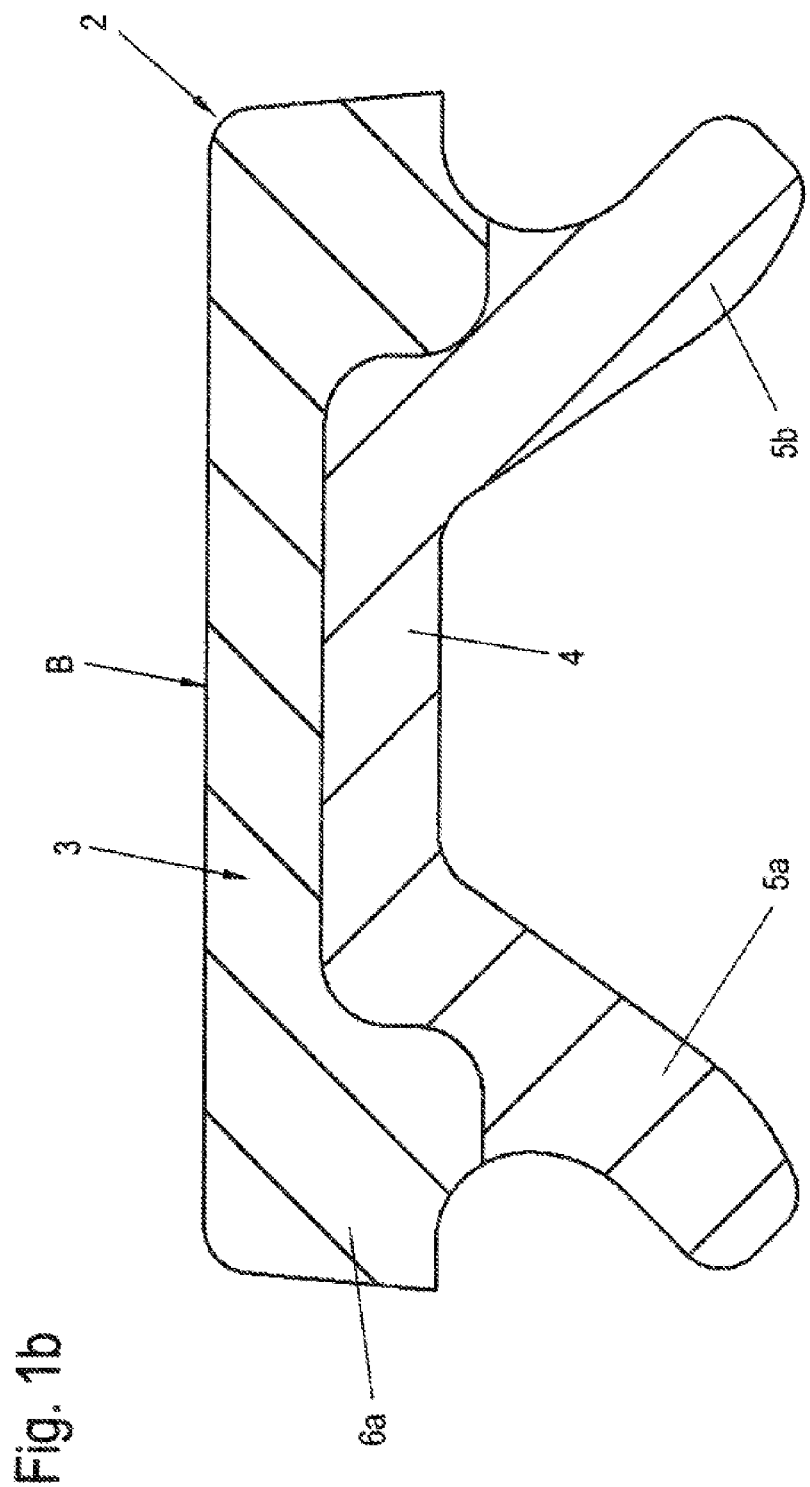
Figure 2:
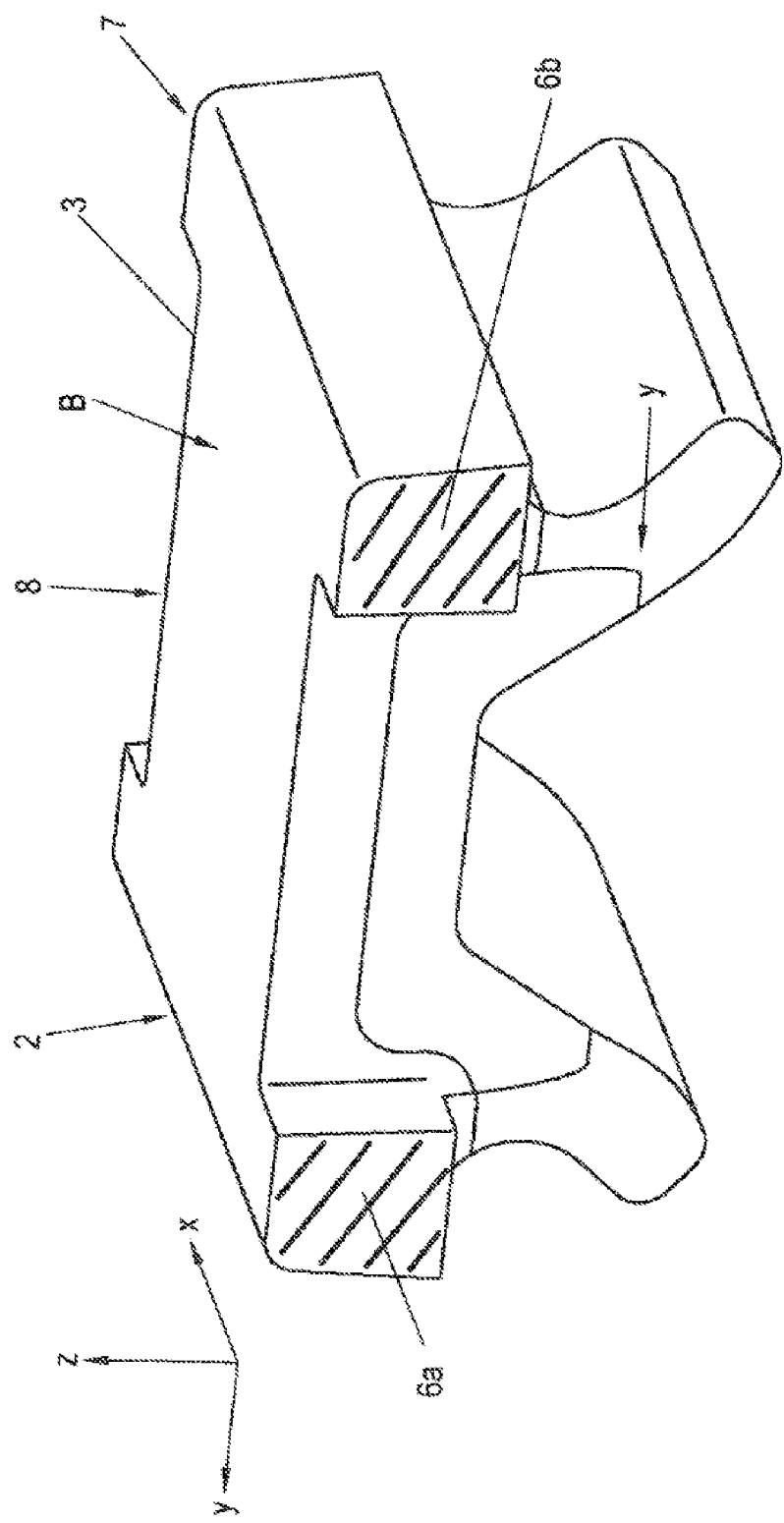
FIG. 2 is a perspective view of an individual marking element of a marking strip with shaded connecting bars.

FIG. 1a shows a marking strip 1 which includes a plurality or variety of marking elements 2a, b, c, that are connected to one another.

The marking strip 1 having the marking elements 2 is designed for marking electrical devices, in particular electrical devices that can be arranged next to each other, preferably terminal blocks that are arranged next to each other. For this purpose, each of the marking elements 2 has a marking plate 3 having at least one writing field or area which can be provided with information thereon. Preferably, the writing field 3 is designed in order to be printed on with a printer.

Each of the marking elements 2 has, on the side facing away from the writing field, a locking contour 4 integrally connected with the respective marking plate 3 for a snap-on connection to a corresponding locking contour (not shown) of a corresponding electrical device.

The locking contour 4 of each marking element is formed by two locking bars 5a, 5b, which are designed to engage in a corresponding locking recess of the electrical devices, so that, after being snapped on the electrical device, they are locked onto the electrical device.

The main extension direction of the marking strip 1 in a stacking direction is marked X. To snap on one of the devices, the respective marking element 2 is moved substantially perpendicularly thereto in a snap-on direction Z. The writing field B of the marking plate extends substantially in a plane X-Y perpendicular to the snap-on direction Z.

The individual marking elements 2 are connected in an expandable and/or bendable connecting region 7 resiliently limited in the X direction to one another by at least one connecting bar. In the embodiment shown, two connecting bars 6a, 6b are provided. The connecting bars 6a, 6b extend in parallel apart from one another. In this way, between the connecting bars 6a, 6b a hole or opening, in particular a peripherally closed elongate hole 8, is formed which passes through the marking strip 1 in a snap-on direction Z perpendicular to the stacking direction thereof Preferably, the elongate hole 8 has a dimension X1 which corresponds to the distance between two marking openings between two devices arranged next to one another. Transverse to the stacking direction, the elongate hole has a dimension Y1. It is also possible to provide, for example, three connecting bars and two holes, wherein the third connecting bar is arranged, for example, in the center between the two outer connecting bars. Alternatively, it is possible to provide only a single connecting bar (for example, in the center), wherein the holes on the two sides of the connecting bar are formed to open toward an edge such as marginal recesses or slits.

Since the distance separating the holes from one another also corresponds to the grid dimension or the width of the devices arranged next to each other, the hole or holes 8 can also be used as sensing marking for sensing the pressure by a sensor for starting or stopping a printing process for printing on a writing field B.

In the region under the connecting bars 6a, 6b between two adjacent marking elements, a slot 9 or groove extending in Y direction is formed which extends transversely to the stacking direction X i.e., in the Y/Z direction completely through the marking elements. In this way, the slot 9 separates the locking bars 5a, b of adjacent marking elements 2a, 2b, etc. from one another. However, against the stacking direction X, the slot 9 extends only some distance into the marking strip and preferably to the end region end of the locking bars 5a, 5b, i.e., into the region in which the locking bars 5a, 5b transition into the marking plate 3. The width of the slot 9 corresponds preferably to the width X1 of the elongate holes 9. The slots 9 also facilitate rolling the marking strip on a spool.

The marking strip 1 is fabricated from a plastic profile produced by an extrusion process and preferably by a co-extrusion process wherein a preferred cross section is provided from FIG. 1a. The extrusion direction corresponds to the main direction of extension X. In the production of the marking strip, in order to define adjacent individual marking elements 2a, 2b in the marking strip 1, at least two punching operations and/or cutting processes take place following extrusion in order to form the slot 9 and the hole 8. The direction thereof is preferably perpendicular to the extrusion direction X.

The first of the punching operations is represented in FIG. 3a. In this punching operation, a punching tool is moved in or against the snap-on direction A in order to form the hole 8 in the connecting region between marking elements 2a, 2b, etc. The slot 9, on the other hand, is preferably formed by an additional punching operation shown in FIG. 3b in or against the Y direction.

It is preferable if, during the production of the marking strip, a multi-component such as a two-component co-extrusion process is used. This means that the marking strip is formed of two different materials.

This extrusion process is preferably carried out in a such a manner that after fabrication or punching, the regions which form the marking plate 3 with the writing surface and the connecting bars 6a, 6b are formed of a first material that is softer than the locking bars 5a, 5b which are formed of a harder second material.

Preferably the region which is formed of the first material is U-shaped in cross section, and the region which is formed of the second harder material is generally V-shaped. For example, soft polyurethane, thermoplastic elastomers or polyamide are suitable for the first material. For the second material, comparatively harder, higher viscosity thermoplastic elastomers and PA, PC, PCABS, harder PUR are suitable.

It is advantageous if, in addition, the connecting bars 6a, 6b are formed completely or partially of the softer and preferably more resilient material. In this way, expansion or compression tolerances in the spaces between adjacent locking recesses can be easily compensated. On the other hand, it is advantageous if the locking bars 5a, 5b are formed of the harder and preferably less resilient material so that they are well suited for performing the locking function.

Moreover, it is advantageous if the marking plate of the marking elements is formed completely or partially of the softer material. This material can be led more easily and more precisely through the region of a printing head than a stiff plate as shown in FIG. 4 which otherwise, during printing, may be oriented at an angle which can affect the quality of the printing process. This is particularly due to the fact that, in the region of a pressure roller 10 which presses the marking strip 1 onto a printing head 11 with a heating bar 12 by an interfering contour 13, an uneven or imperfect application on the heating bar can occur. On the other hand, if the printing plate is made of a sufficiently flexible material, this does not occur. Rather, due to the resilience of the material, the material is pressed securely on the heating bar as shown in FIG. 4. The marking strip is slightly deformed before and after the heating bar and is applied firmly against the heating bar.

For marking a terminal block assembly on a supporting rail, all that needs to be done then is to lay the marking strip 1 in the region of the locking contours of the terminal blocks arranged next to each other as shown in FIG. 1a and then press on the individual marking elements 2 from above so that reliable locking of the marking elements 2 on the terminal blocks occurs. At that time or before, the marking strip is cut to length from an endless strip onto a spool so that the number of the marking elements 2a, 2b, 2c, etc. corresponds to the number of the devices arranged next to each other that are to be marked. The marking strip of FIG. 1a is thus suitable for marking three devices arranged next to each other. However, it is also possible to mark many more devices arranged next to each other in one working step.

In FIG. 5, an alternative embodiment of the marking strip 1 is shown. According to this alternative embodiment, the marking strip 1 includes a marking plate 3 for each of the marking elements 2. These marking plates 3 are also integrally connected to one another via connecting regions 7. However, the connecting regions are designed in such a manner that across several of the marking elements 2, an overlying continuous writing surface is formed which includes the marking plates 3 integrally connected to one another. In the connecting regions 7 of the marking plates 3, no holes 8 or marginal recesses are formed. Preferably, the marking plates 3 and the connecting regions 7 have an identical cross section. This simplifies production due to the omission of the step for introducing the holes and it optimizes writability.

The locking contours 4 of the embodiment of FIG. 5 contain slots 9 or grooves extending in the Y direction which extend transversely to the stacking direction X, i.e., in the Y/Z direction completely through the locking contour 4. In this manner, each slot 9 separates the locking bars 5a, 5b. The slot/groove 9 extends against the stacking direction X. The width of each slot 9 corresponds to the width X1. The slots 9 between the locking contour 4 also facilitate rolling of the marking strip on a spool.

The intervals between the slots 9 between the locking bars 5a, b of the marking elements 2 lying next to each other have sizes such that the width of the remaining locking contour 4 plus the width X1 of the slot 9 corresponds to a grid dimension of the device width such as the width of a terminal block. A tolerance compensation for bridging tolerances which are produced by arranging devices such as terminal blocks next to each other, is ensured by the connecting regions 7 of the marking plates which, like the marking plate, are produced from a resilient plastic and as a result can compensate for tolerances in the marked state.

In an alternate embodiment, the marking strip 1 is fabricated from a plastic profile produced by an extrusion process, preferably by a co-extrusion process, with a preferred cross section as shown in FIG. 6. The extrusion direction corresponds to the main direction of extension X as shown by the coordinate system in FIG. 5.

The slots 9 are produced by punching or cutting processes. The punching direction is preferably perpendicular to the extrusion direction X or in or against the Y direction.

Preferably, a multi or two-component co-extrusion process is used in the production of the marking strip 1 according to the alternative embodiment. This means that the marking strip 1 of the alternative embodiment of FIGS. 5 to 8 is also formed of at least two different materials.

Preferably, this extrusion process is again carried out in such a manner that the regions which form the marking plate 3 with the writing surface include a first material that is softer than the locking contour 4 or the locking bars 5a, 5b which are formed of a harder second material.

The locking bars 5a, 5b are preferably formed of the harder and preferably less resilient material so that they are well suited for performing a locking function. The marking plate 3 has regions 3' which lie directly above the locking contour 4, and regions 3" which lie above and between the locking contours 4. Since the marking plate is formed of a softer plastic material than the locking contours 4, the regions 3" lying between the locking contours fulfill the function of the connecting region 7 between the locking contours 4.

The marking plate 3 is preferably formed completely or partially of the softer material. This material can be led more easily and more precisely through the region of a printing head than can a stiff marking plate as shown in FIG. 4.

Figure 7A:
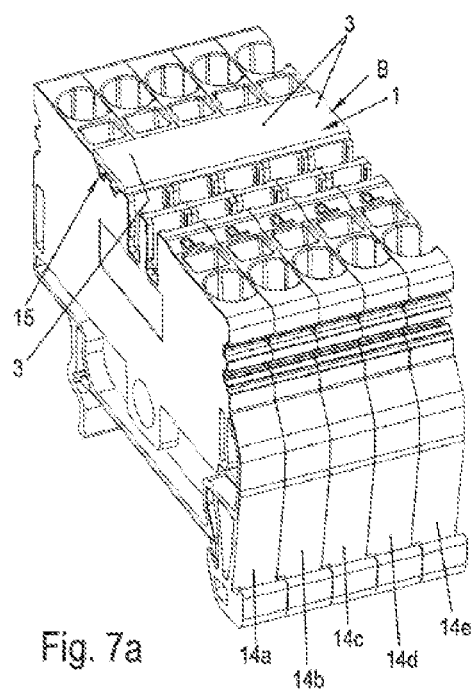
FIG. 7a is a perspective view of a plurality of terminal blocks arranged next to each other with an inserted marking strip according to FIG. 5.
Figure 7B:
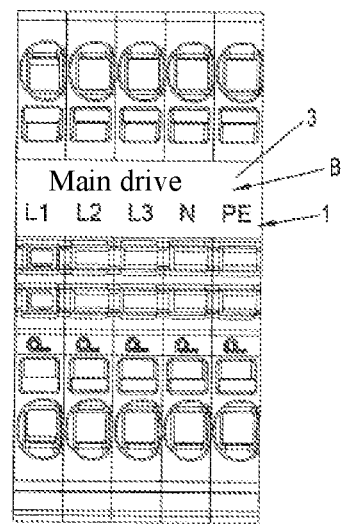
FIG. 7b is a front view of the terminal blocks arranged next to each other according to FIG. 7a with an inserted marking strip according to FIG. 5.

For marking a housing assembly such as an assembly 14 of terminal blocks 14a, 14b, 14c, etc. as shown in FIG. 7a or FIG. 7b on a supporting rail, all that needs to be done is to lay the marking strip 1 in the region of the locking contours 15 of the terminal blocks arranged next to each other as shown in FIG. 5 and then press on the marking plate 3 from above so that the marking strip 1 is securely snapped on the terminal blocks. The marking strip 1 is then cut to length from an endless strip wound on a spool so that the length of the section corresponds to the length of the devices arranged next to each other that are to be marked. As a result, the marking strip 1 is thus suitable for marking five devices arranged next to each other as shown in FIGS. 7a and 7b. However, it is also possible to mark many more devices arranged next to each other in one step.

In FIG. 8, a further embodiment of the marking strip 1 is shown. In the marking strip 1 according to FIG. 8, the harder plastic material in the connecting region 7 is not completely cut through by the slot 9 so that in the connecting region 7 between the locking contours formed of the harder plastic material, a bridge 17 made of the harder plastic material is provided which is not interrupted by the slot 9 perpendicular to the stacking direction, and which lies under the softer plastic material. Only actual locking bars 5a, 5b are cut through by the slots 9. In this manner, the softer plastic material is well supported over a large area downward, which facilitates printing. The bridge 17 of harder material is cut through completely or almost completely up to the softer material under the marking plate in the region 3″ thereof in the connecting region 7 between two locking contours 4, preferably in the region of the elongate hole 8, by a slit 16 which extends in the Y direction in accordance with the coordinate system in FIG. 8 or perpendicularly to the stacking direction. The slit 16 is preferably smaller than the slot 9. Preferably, it has the width of a thin knife producing the slit 16. Due to these slits 16, the marking strip in the printer and at the time of the snapping on remains sufficiently flexible and movable and can compensate for expansion and compression tolerances in the connecting region 7. In addition, the production is simplified.

The marking strip 1 of FIG. 8 preferably contains holes such as elongate holes 8 which pass through the marking plate 3 made of softer plastic material and the bridge 17 made of harder plastic material in the direction Z, i.e. the snap-on direction, preferably perpendicular to the stacking direction of the marking strip 1 so that the connecting bars 6 are formed on both sides of the holes 8. These connecting bars 6 are formed of softer plastic material. The harder plastic material lies below the connecting bars, cut through completely or almost completely only by the slit 16. However, it is also conceivable that the slot 9 is provided only in the locking bars 5a, 5b. The remaining hard connection between two signs is preferably only slit, without ablating material. In this way, resilience of the strand in the X direction is also achieved, although the strand per se is still more stable, which is advantageous for handling in the printer.

According to FIG. 8, the elongate hole 8 has an width X2 in the stacking direction which is smaller than the distance X1 between two marking openings between two devices arranged next to one another. Since the distance between the holes corresponds to the grid dimension or the width of the devices arranged next to each other, the hole or holes 8 can also be used as sensing markings for sensing by a printer sensor for starting or stopping a printing process for printing on a writing field B.

Perpendicular to the stacking direction or in the Y direction according to the coordinate system in FIG. 8, the elongate hole 8 has a depth Y2 wherein Y2 is smaller than or equal to Y1.

In FIG. 7a and FIG. 7b, the marking strips of the alternative embodiments according to FIGS. 5 and 6 are characterized in that no openings interrupt the marking plate so that text or markings may span over the devices. In FIG. 7a and FIG. 7b, the writing of a main drive is carried out spanning over the devices, for example. The writing main drive such as a drive motor operated with 3-phase alternating current voltage L1 to L3 and including a neutral conductor connection N and a protective conductor connection PE spans over five devices such as the terminal blocks 14.

In order to provide indexing for a printer for writing on the marking strip 1 of the alternative embodiment according to FIG. 5, various possibilities are available, depending on the sensor type used for indexing. Due to indexing, the printer recognizes a predetermined grid dimension for a corresponding device designation.

A sensor hole in the marking plate 3 represents a first structure for indexing. A forked photoelectric sensor is preferably used for a printer. Another possibility for indexing is to color the locking foot 4 with a dark color while the marking plate 3 is light colored. As a result, from below, i.e., in the direction of positive Z values according to the coordinate system in FIG. 5, a continuous light-dark pattern which is ideally designed with as much contrast as possible is present. Such a light-dark pattern can be read by a retroreflective sensor. In a third indexing embodiment, the soft component, in this case the marking plate 3, is designed to be sufficiently permeable to light. This occurs by a corresponding measurement of the thickness in the Z direction) of the marking plate and/or by a corresponding material selection, where transparent or translucent materials are preferable. Thus, a photoelectric sensor that can see through the soft component can also be used as the sensor.

In particular, the second and third possibilities for indexing result in an optically more suitable design of the marking strip 1 or of the marking plate 3 since an indexing perforation is dispensed with.

In addition, with these sensing possibilities, a larger writable surface per device or per grid dimension is provided in comparison with indexing perforations for sensing.

The invention claimed is:

1. A marking strip for marking adjacent electrical devices, comprising a plurality of marking elements which are connected to each other by connecting regions, respectively, each marking element including a marking plate having a writing area on one side and an integral locking portion on a side opposite the writing area, said locking portion of said marking strip being formed of a synthetic plastic material having a first degree of hardness and at least said marking plate writing area and at least a portion of said connecting regions being formed of a synthetic plastic material having a second degree of hardness, said second degree of hardness being less than said first degree of hardness.

2. A marking strip as defined in claim 1, wherein said marking strip is an extruded marking strip.

3. A marking strip as defined in claim 1, wherein said marking strip, is a co-extruded marking strip.

4. A marking strip as defined in claim 1, wherein said connecting regions include at least one connecting bar.

5. A marking strip as defined in claim 1, wherein said connecting regions and said marking plates have the same cross-sectional configuration to define a continuous writing surface across the marking strip.

6. A marking strip as defined in claim 1, wherein said marking plate extends continually across a plurality of marking elements to define a continuous writing area across a plurality of marking elements.

7. A marking strip as defined in claim 1, wherein said connecting regions are continuous and free of any openings.

8. A marking strip as defined in claim 1, wherein said locking region of each marking element is formed of a material having a darker color than a material of said marking plate.

9. A marking strip as defined in claim 1, wherein said marking plates include one of translucent and transparent regions.

10. A marking strip as defined in claim 1, wherein each of said connecting regions contain a bridge formed of a synthetic plastic material having said first degree of hardness, each bridge containing a slit.

11. A method for manufacturing the marking strip as defined in claim 1, comprising the steps of (a) extruding two synthetic plastic materials of different hardness using a co-extrusion process, one of said materials forming said locking portion of each marking element and the other of said materials forming said marking elements and said connecting regions; and (b) separating said locking portions of adjacent marking elements from each other.

12. A method as defined in claim 11, and further comprising the step of weakening said connecting regions between said extruding and separating steps.

13. A method as defined in claim 11, and further comprising the step of forming a slit in said locking portion adjacent to said connecting region between two adjacent marking elements.

14. A method for manufacturing the marking strip as defined in claim 1, comprising the steps of (a) extruding two synthetic plastic materials of different hardness using a co-extrusion process, one of said materials forming said locking portion of each marking element and the other of said materials forming said marking elements and said connecting regions; (b) separating said locking portions of adjacent marking elements from each other; and (c) forming an elongate opening in said connecting regions between said extruding and separating steps.

15. A marking strip for marking adjacent electrical devices, comprising a plurality of marking elements which are connected to each other by connecting regions, respectively, said connecting regions each containing at least one elongate opening which extends in a snap-on direction perpendicular to a stacking direction of said marking elements, each marking element including a marking plate having a writing area on one side and an integral locking portion on a side opposite the writing area, said locking portion of said marking strip being formed of a synthetic plastic material having a first degree of hardness and at least said marking plate writing area and at least a portion of said connecting regions being formed of a synthetic plastic material having a second degree of hardness, said second degree of hardness being less than said first degree of hardness.

16. A marking strip as defined in claim 15, wherein said opening is formed between a pair of connecting bars.

17. A marking strip as defined in claim 15, wherein said opening has a closed periphery.

18. A marking strip as defined in claim 15, wherein said opening comprises a sensing element for a sensor of a printer.

19. A marking strip as defined in claim 15, wherein said opening is formed in a marginal portion of said connecting region and is open in at least an open peripheral portion.

20. A marking strip for marking adjacent electrical devices, comprising a plurality of marking elements which are connected to each other by connecting regions, respectively, said connecting regions including at least one connecting bar, each marking element including a marking plate having a writing area on one side and an integral locking portion on a side opposite the writing area, said marking element locking portion including spaced locking bars extending from a lower surface thereof, said connecting regions each containing a slot beneath said connecting bars to space said locking bars of adjacent marking elements, said locking portion of said marking strip being formed of a synthetic plastic material having a first degree of hardness and at least said marking plate writing area and at least a portion of said connecting regions being formed of a synthetic plastic material having a second degree of hardness, said second degree of hardness being less than said first degree of hardness.

21. A marking strip as defined in claim 20, wherein said marking plate writing areas have a U-shaped cross-section configuration and said locking portions have V-shaped cross-section configuration.

22. A marking strip as defined in claim 20, wherein said slot separates said locking regions from each other between said locking bars.

23. A marking strip as defined in claim 20, wherein said locking portion contains a bridge portion formed of a synthetic plastic material having a first degree of hardness above each slot between said locking bars, said continuous marking plate and said locking portion extending continuously along the marking strip.

24. A marking strip as defined in claim 23, wherein each bridge portion contains a slit extending perpendicular to a stacking direction of said marking elements.

* * * * *